United States Patent [19]
Dennis

[11] 3,761,724
[45] Sept. 25, 1973

[54] DOUBLE BEAM HYDROCARBON GAS DETECTOR

[75] Inventor: James L. Dennis, Dallas, Tex.
[73] Assignee: Resalab, Incorporated, Dallas, Tex.
[22] Filed: July 6, 1972
[21] Appl. No.: 269,317

[52] U.S. Cl.................250/565; 356/205; 250/209, 340/237 R
[51] Int. Cl. ........................................... G01n 21/26
[58] Field of Search ...................... 250/218, 43.5 R, 250/209; 356/179–181, 201, 204–208, 209; 23/232 R, 232 E, 254 E; 340/237 R

[56] References Cited
UNITED STATES PATENTS

| | | | |
|---|---|---|---|
| 3,447,370 | 6/1969 | Tanzman | 250/218 X |
| 3,459,951 | 8/1969 | Howarth et al. | 356/205 X |
| 3,569,696 | 3/1971 | Karlson | 250/43.5 R |
| 3,677,652 | 6/1971 | Little | 250/218 X |
| 3,690,772 | 9/1972 | Endl | 356/179 |

Primary Examiner—Walter Stolwein
Attorney—D. Carl Richards et al.

[57] ABSTRACT

Hydrocarbon gas in a sample is measured by a double beam detector responding to the transmission of absorption properties of the gas in response to applied radiation from a laser source. Monochromatic light from the laser source is split into two radiation beams, a sample path beam and a reference path beam, and directed to a radiation detector which sequentially responds to the reference energy and the sample energy. A difference in the absorption by the sample path energy with respect to the reference path energy produces two, different level, output signals from the detector. The sample energy signal and reference energy signal are respectively directed to a sample channel circuit and a reference channel circuit. Outputs from the individual circuits are amplified logarithmically and applied to inputs of a differential amplifier wherein the ratio of the sample signal to the reference signal produces a voltage for actuating a meter indicator. For a hydrocarbon gas content in a sample in excess of a predetermined limit, an alarm circuit actuates to give an audible warning of an excessive gas content.

21 Claims, 5 Drawing Figures

DOUBLE BEAM HYDROCARBON GAS DETECTOR

This invention relates to the detection of low level concentrations of hydrocarbon gas and more particularly to a dual beam hydrocarbon gas detector responsive to concentrations of hydrocarbon vapors which may constitute a toxic, combustible, or explosive hazard.

Heretofore, gas detectors of the type generally in commercial use have employed Nerhst glowers, or glow bars, as an infrared source of system energy. Such conventional incoherent sources, to operate properly, must be of a fragile construction and therefore have a relatively short useful life. More importantly, detectors of this type have limited sensitivity which may be increased only at the expense of increased complexity and bulk of the detector system. Another disadvantage of conventional detectors that employ incoherent energy sources is that the transmitted beam power varies a direct function of the aperture size of the transmitting optics. As a result, the power, and therefore the signal-to-noise ratio, of the beam received by receiving optics and in turn a detector system is relatively low and a limiting factor on system sensitivity. Circuits responsive to systems employing incoherent radiation detectors thus lack desired accuracy due to variations of the output signal source power and the noise-to-signal ratio.

A feature of the present invention is to provide a hydrocarbon gas detector employing a coherent light source in the form of a laser producing energy in the wavelength region of 3.39 microns. Energy provided by the coherent energy source is split along a sample path and a reference path and directed to a radiation detector. Because of the coherent nature of the laser beam, maximum power from the source to the detector is transmitted thereby providing a desirable signal-to-noise ratio output from the detector. A sample beam signal and a reference beam signal from the radiation detector is applied to a differential measuring system detector that provides automatic compensation for power source variation to provide consistently accurate meter readings of gas concentration.

In the simplest form of a double beam system as employed in the present invention, radiation from a laser source is split into two beams so as to pass along two separate paths of different length which include a sample path through a sample chamber and a reference path directly to a radiation detector wherein the intensity of the two beams provide output signals for comparison in a responsive circuit. The radiation sensitive device, such as a photo multiplier tube, senses alternately radiation pulses from the sample beam and reference beam to generate separate signals for application to amplifier circuitry that produces a composite series signal of the alternating reference and sample pulses, the amplitude of which corresponds to the intensity of the light transmitted through the sample and reference path. The detector and the circuit responsive thereto are synchronized with the operation of a beam switch or chopper to provide the required degree of signal separation such that an accurate meter reading may be produced that is proportional to the concentration of hydrocarbon gas in the chamber of the sample beam.

In accordance with the present invention, a hydrocarbon gas detector using a monochromatic light source emitting radiation in a region absorbent of hydrocarbon molecules includes means for splitting the light source beam into a sample path and a reference path both directed to a detector having an output related to the energy in the sample path and reference path. Responsive to the detector output related to the sample path signal and reference signal is a sample path circuit responding to the output signal of the detector related to the sample path energy and a reference path circuit responding to the output signal of the detector related to the reference path energy. A logarithmic amplifier connected to the output of the sample channel circuit and the reference channel circuit generates two outputs; one varying as a logarithm of the sample channel output and the second varying as the logarithm of the reference channel output. Responsive to the two output signals is a differential amplifier having an output varying as the logarithm of the ratio of the sample channel output over the reference channel output. This output signal from the differential amplifier is applied to an output circuit that generates at a meter a measure of hydrocarbon gas in a sample chamber.

More specifically, the hydrocarbon gas detector of the previous paragraph includes timing circuitry for establishing a timing interval for connecting the sample channel circuit to the detector output to respond only to the sample path energy and for alternately connecting the reference path circuit to the detector to respond only to the reference path energy.

A more complete understanding of the invention and its advantages will be apparent from the specification and claims and from the accompanying drawings illustrative of the invention:

Referring to the drawings.

Figure 1:
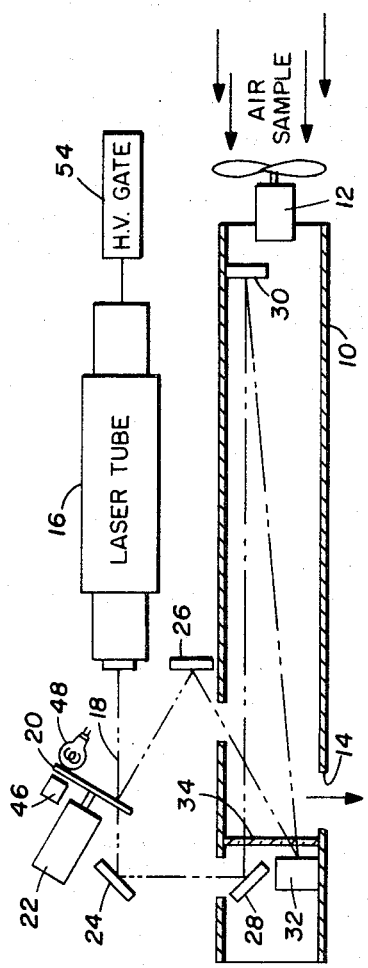
FIG. 1 is a schematic of the hydrocarbon gas detector with a laser energy source providing an energy beam chopped into a reference beam and a sample beam directed to a radiation detector.

Referring to the FIGURES, there is shown in FIG. 1 a sample chamber 10 with a suction fan 12 mounted at an open end thereof for drawing an air sample in the sample chamber for evaluation of hydrocarbon gas content. A sample drawn into the chamber 10 exhausts through an outlet 14 to atmosphere.

To evaluate a sample within the chamber 10 for hydrocarbon gas content, a laser 16 produces a monochromatic energy beam 18 to a chopper wheel 20 driven by a motor 22. Rotation of the chopper wheel 20 alternately passes the beam 18 to a mirror 24 and a mirror 26. An energy beam incident on the mirror 24 is reflected therefrom to a mirror 28 for further reflection to a mirror 30 and subsequently to a radiation detector 32. A light path established from the mirrors 24, 28 and 30 to the detector 32 constitutes a sample path beam through the sample chamber 10. With the chopper wheel 20 in a position to reflect the beam 18 to the mirror 26, an energy beam is further reflected to the radiation detector 32. This light path from the chopper wheel 20 to the mirror 26 and the radiation detector 32 is a reference path beam and passes through the sample chamber 10 for a relatively short distance as compared with the sample path beam reflected from the mirror 30. Positioned immediately in front of the radiation detector 32 is a blocking filter 34 for preventing various signals from impinging on the detector 32, and further protects the detector from the corrosive and abrasive constituents of the gas sample drawn through the sample chamber 10.

Although the laser 16 may be any energy source providing radiation in a bandwidth absorbent of hydrocarbon gas, the helium-neon laser emission at 3.39 microns is particularly well suited because it is near the fundamental vibration frequency of the coupling between the hydrogen and carbon atoms. The absorption of 3.39 micron wavelength light by hydrocarbon gases is expressed mathematically by the Lambert-Beer's Law as follows:

$$P/P_o = \epsilon^{-\alpha x \times \rho}$$

where $P/P_o$ is the ratio of transmitted power in the sample beam and the reference beam through a gas sample in the chamber 10, $\alpha$ is a constant peculiar to the particular gas, $x$ is the light path length of the sample path, and $\rho$ is the partial pressure of the gas within the chamber 10. FIG. 1 illustrates a system wherein signals from the radiation detector 32 are coupled to circuitry for evaluating equation (1) to give a measure of hydrocarbon gas in an air sample drawn into the sample chamber 10.

Figure 2:
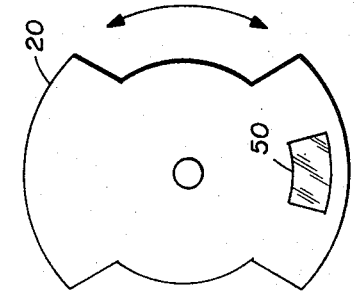
FIG. 2 is a block diagram of a sample channel circuit and a reference channel circuit responsive to the output of a radiation detector for producing a meter indication of hydrocarbon gas concentration.

Referring to FIG. 2, there is shown a block diagram of a system for providing a measure of hydrocarbon gas in the sample chamber 10 in accordance with equation (1) above. Energy from the laser 16 after being chopped into a sample path and a reference path by means of the chopper wheel 20 impinges on the radiation detector 32. As an example of a radiation detector, it may be an indium-arsenide or lead selenium photodiode; such photodiodes have been found to be reasonably efficient at detecting 3.39 microns wavelength light energy. Output signals from the detector 32 are applied to a clamper circuit 36 which functions to bias the output of the detector to zero during dark current conditions, as will be explained. Operation in this mode produces less dark current distortion and bias shift. An output of the clamper 36 is applied to an amplifier 38 for amplification of the clamper signal to a level for operating peak detector circuits. A gated peak detector sample channel circuit 40 and a gated peak detector reference channel circuit 42 are both connected to the output of the amplifier 38.

Upon rotation of the chopper wheel 20 by the motor 22, energy from the laser 16 is sequentially split into a reference beam and a sample beam, as explained. During the time interval of the existence of the sample path beam, the peak detector 40 is gated on by the output of a timing and logic circuit 44. Gating on the detector 40 applies the output of the amplifier 38 to the detector circuitry wherein it is stored for subsequent processing. Rotation of the chopper wheel 20 to establish a reference path causes the logic circuit 44 to turn off the peak detector 40 and gate on the peak detector 42. During this time frame, an output from the amplifier 38 is applied to the peak detector 42 wherein it is stored for subsequent processing.

Figure 3:
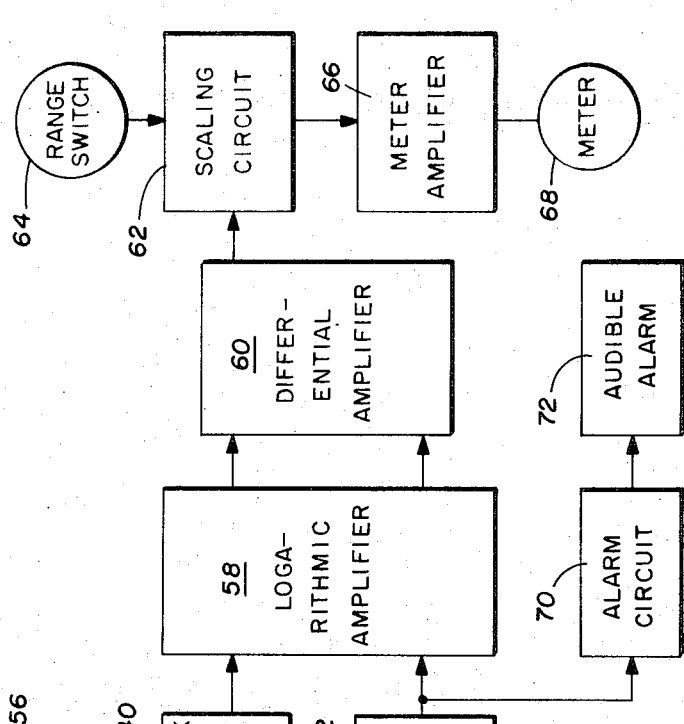
FIG. 3 is an end view of the chopper disc for splitting the laser energy beam of the system of FIG. 1 into a reference beam and a sample beam.

To establish the timing sequence for gating on the peak detectors 40 and 42, a photodetector 46 is positioned to respond to light from a source 48 during rotation of the chopper wheel 20. As shown in FIG. 3, the chopper wheel constitutes a circular disc having removed sections which allows the transmission of energy from the laser 16 to the mirror 24 to establish the sample path and also permits transmission of light from the source 48 to the detector 46. When the motor 22 rotates the disc 20 such that a mirror 50 is in the path of the beam 18, the reference path is established by reflection from the disc mirror 50 to the mirror 26 and subsequently to the radiation detector 32. During this time interval, light from the source 48 is blocked from the photodetector 46. An output from the photodetector 46 steps the timing and logic circuit 44 to gate on the peak detectors 40 and 42 at the appropriate time to accept signals from the amplifier 38.

In order to conserve power, the laser 16 is turned on only a small portion of the available time; that is, it is pulsed approximately five times per second, in a typical application, resulting in a duty cycle of 12 ½ percent. This is accomplished by a high voltage gate signal on line 52 from the timing and logic circuit 44 as applied to the high voltage gate terminal 54.

Coupled to the peak detector circuit 40 is a gain control 56 for adjusting the output of the detector to match the output of the detector 42 under conditions of no hydrocarbon gas in the sample chamber 10. Also coupled to the output of the reference peak detector 42 is an alarm circuit 70 driving an audible alarm 72.

An output from the peak detector 40 and the peak detector 42 is applied to inputs of a logarithmic amplifier 58 which accepts the inputs, converts each into a voltage proportional to the logarithm of the input and provides two output signals varying in accordance with the detector outputs. Connected to the logarithmic amplifier 58 is a differential amplifier 60 that accepts each of the outputs of the amplifier 58 on separate input channels. The differential amplifier 60 produces one output signal that is proportional to the logarithm of the ratio of the sample path energy to the reference path energy. This signal is applied to a scaling circuit 62 that provides various instrument sensitivities by means of a range switch 64. An output of the scaling circuit 62 is applied to a meter amplifier 66 for coupling to a meter movement 68.

In operation of the circuit of FIG. 2, an output of the detector 32 is a series of pulses of two types. The first is a series of pulses whose amplitude varies in proportion to the light intensity of the reference path as established by the mirror 26 and the second type is a series of pulses whose amplitude varies in proportion to the light intensity of the sample path as reflected from the mirror 30 through the sample chamber 10. The sample path traverses the length of the test chamber 10 twice and is thus subjected to a greater absorption by hydrocarbon gases present in the sample chamber than the reference beam which follows a relatively short path from the mirror 26 through the chamber 10 to the detector 32.

Each of the pulse trains is sequentially generated by operation of the chopper wheel 20 and the timing logic 44 and is applied to the clamper 38 and amplified in the amplifier 38. The pulse train of the sample path is applied to the peak detector 40 which is gated on only when the sample pulses are present. Within the peak detector 40 a capacitor is charged to the peak value of the sample pulses. In a similar manner, the series of pulses from the reference path are applied to the peak detector 42 wherein a capacitor is charged to the peak value of the reference pulses. The output of each peak detector 40 and 42 is applied to the logarithmic amplifier 58 having outputs proportional to the logarithm of the inputs. The difference between the two inputs of the logarithmic amplifier 58 is a voltage representing the difference of logarithms (equal to the logarithm of the ratio of $P/P_0$ of equation 1) of the two inputs. This difference signal is generated by applying the two outputs of the logarithmic amplifier 58 to the difference amplifier 60.

If the Lambert-Beer's Law as expressed in equation (1) is implemented directly from the peak detectors 40 and 42, an output voltage would be generated which varies exponentially with gas concentration in the sample chamber 10. By taking the logarithm of the sample path signal and the reference path signal, the output voltage of the differential amplifier 60 varies linearly with gas concentration. This linearly varying voltage is applied to the scaling amplifier 62 for operating a meter movement 68 after further amplification in the meter amplifier 66.

As the concentrations of hydrocarbon within the sample chamber 10 increases, the amplitude of the series of pulses from the detector 32 representing the sample path output decreases. Thus, the amplitude of the series of sample path pulses varies inversely with hydrocarbon concentrations in the chamber 10. At some level of concentration of hydrocarbon within the sample chamber 10, the output of the detector 32 will be driven to some minimum value when responding to the sample path energy. This renders ineffective the sample peak detector 40. At these high concentrations of hydrocarbons within the sample chamber 10, the intensity of energy in the reference path begins to diminish due to absorption by hydrocabon molecules. This absorption by hydrocarbon molecules of the reference path energy causes a decrease in the amplitude of the series of pulses from the detector 32 for the reference path. The output of the reference peak detector 42 begins to decrease in proportion to the increased concentration of hydrocarbons within the sample chamber 10. Such a high concentration of hydrocarbon gas within the sample chamber 10 is an indication of a possibly explosive mixture. As the concentration reaches a preestablished upper level, the output of the reference peak detector 42 drops below a set point that triggers the alarm circuit 70. Triggering the alarm circuit 70 turns on the audible alarm 72 giving an audible signal that a dangerous concentration of hydrocarbon gas has been drawn into the sample chamber 10.

Figure 4:
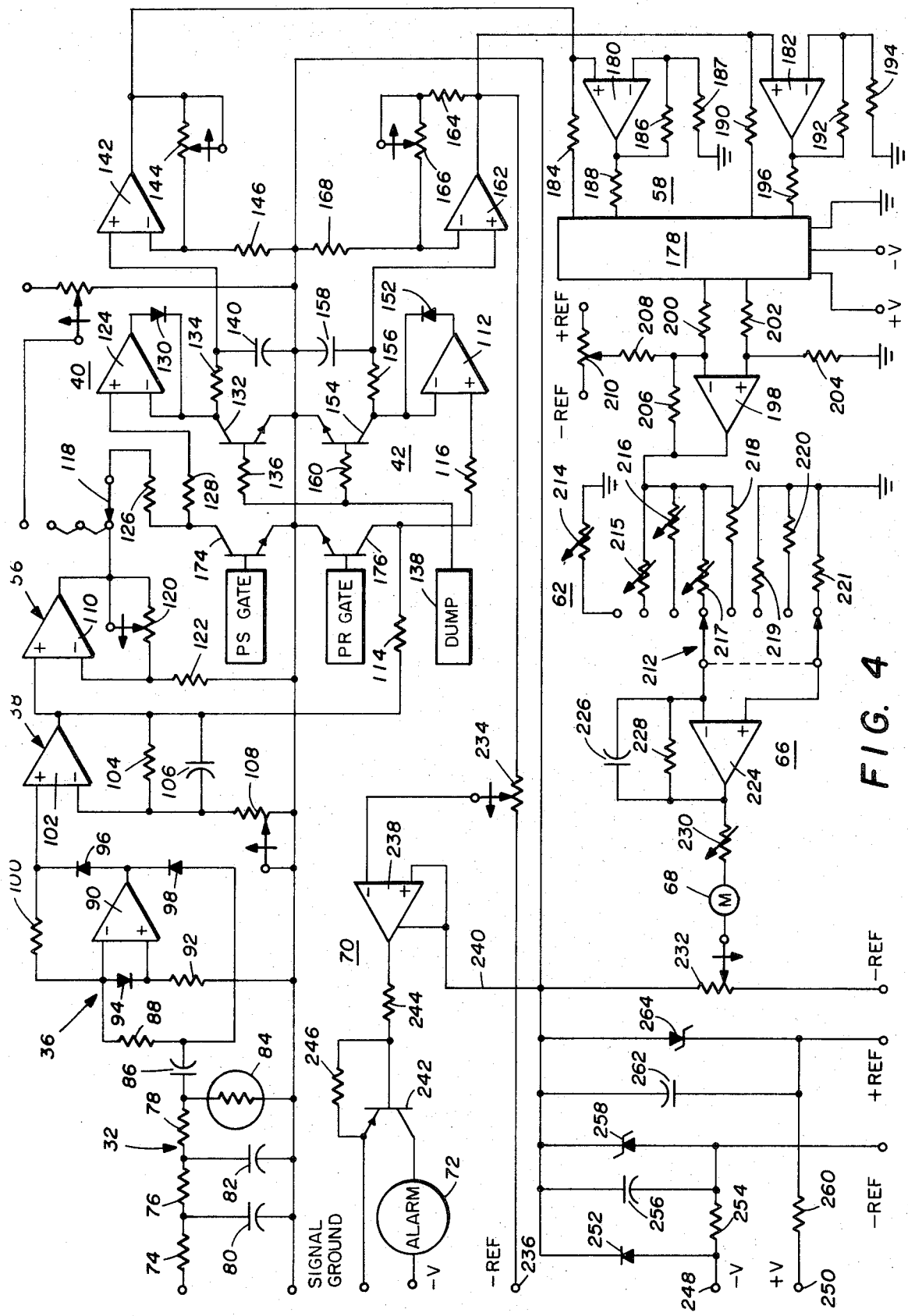
FIG. 4 is a detailed circuit schematic of the sample and reference channel circuits and the logarithmic and differential amplifiers responsive to the outputs of both channels.

Referring to FIG. 4, there is shown a preferred circuit for implementing the Lambert-Beer's Law to produce a linearly varying voltage to a meter movement 68 in response to the output of the detector 32. Detector 32 comprises a lead selenium photodiode 84 coupled to the output of a filter network including resistors 74, 76 and 78 and capacitors 80, 82 and 84. A coupling capacitor 86 in series with a resistor 88 applies signals from the diode 84 to one input of an operational amplifier 90 having a second input connected to ground through a resistor 92. Coupled across the inputs of the amplifier 90 is a diode 94 and connected to the output are two diodes 96, 98. A feedback resistor 100 interconnects between the cathode of the diode 96 and one input of the amplifier 90.

Amplifier 90 and circuitry associated therewith comprise the clamper circuit 36 that has an output at the diode 96 connected to one input of an operational amplifier 102. A feedback circuit including a resistor 104 in parallel with a capacitor 106 couples to a second input of the amplifier 102. A variable resistor also connects to the second input of the amplifier 102 and to ground.

Amplifier 102 and circuitry associated therewith comprise the amplifier 38 having an output connected to an operational amplifier 110 and an operational amplifier 112; the latter through resistors 114 and 116. Amplifier 110 has an output tied to a four-position switch 118 and a variable resistor 120 in a feedback path to a second input of the amplifier. Also connected to this second input is a resistor 122 connected to circuit ground. Amplifier 110 and the feedback network including resistors 120 and 122 comprise the gain control circuit 56 for setting the output of the sample peak detector 40 equal to the output of the reference peak detector 42 when no gas is present in the sample chamber 10. The wiper arm of the switch 118 connects to one input of an operational amplifier 124 through resistors 126 and 128.

Operational amplifiers 112 and 124 and circuitry associated therewith comprise the reference peak detector and sample peak detector, respectively. For the sample peak detector 40, the operational amplifier 124 has an output coupled through a diode 130 to the collector electrode of a transistor 132 and one side of a resistor 134. Transistor 132 has an emitter electrode connected to ground and a base electrode connected through a resistor 136 to a terminal 138 to which is applied a timing signal for clearing both the peak detectors 40 and 42. Connected to the second terminal of the resistor 134 is a capacitor 140 and one input of an operational amplifier 142. Capacitor 140 receives the series of pulses generated by the detector 32 in response to light intensity in the sample path and is charged to the level of the series of pulses and retains the charge until cleared by application of a signal to the base electrode of transistor 132 causing this transistor to turn on.

Connected to the output of the operational amplifier 142 is a feedback network including a variable resistor 144 and a resistor 146 connected to ground. The interconnection of the resistors 144 and 146 ties to the second input of the operational amplifier 142. An output of the amplifier 142 generated at the junction of the resistor 144 is the peak sample path signal from the sample peak detector 40.

For the reference peak detector 42, the operational amplifier 112 has an output connected to a diode 152 in a feed-back path to the second input of the amplifier. Also tied to the second input of the amplifier 112 is the collector electrode of the transistor 154 and one terminal of a resistor 156. A second terminal of the resistor 156 connects to a capacitor 158 that receives and stores the series of pulses from the detector 32 representing the intensity of the reference path energy. Transistor 154 has an emitter electrode connected to circuit ground and a base electrode connected to the terminal 138 through a resistor 160. Transistor 154 thus operates to complete the same function as transistor 132, that is, to clear the reference peak detector 42 prior to receiving an updated series of pulses from the detector 32.

An interconnection of the capacitor 158 and the resistor 156 ties to one input of an operational amplifier 162 having an output coupled through a feedback network including a resistor 164 and a variable resistor 166 to a second input of the amplifier. The variable resistors 144 and 166 are an adjustment to balance the output of the peak detectors 40 and 42 during a calibration cycle. Also connected to the second input of the amplifier 162 is a resistor 168 tied to ground. An output of the operational amplifier 162 at the junction of the resistor 164 is the output of the reference peak detector 42.

As explained previously, each of the detectors 40 and 42 is gated on only during the time necessary to receive the correct series of pulses from the detector 32. For the peak detector 40, this gating circuit includes a transistor 174 having a collector electrode connected to resistors 126 and 128 and an emitter electrode connected to ground. This transistor is controlled by a signal from the logic circuit 44 as applied to the base electrode. The reference peak detector 42 includes a transistor 176 for gating the circuit to receive pulses from the detector 32. Transistor 176 includes a collector electrode connected to the resistors 114 and 116 and an emitter electrode connected to circuit ground. Control of the transistor 176 is by a signal from a logic circuit 44 as applied to the base electrode.

Voltages at the output of the operational amplifiers 142 and 162 are applied to the logarithmic amplifier 58 that includes two amplifiers in groups of two within the blocks 178 and operational amplifiers 180 and 182. Connected to one input of an amplifier within the block 178 through a resistor 184 is the output of the reference peak detector 42. This signal is also applied to one input of an operational amplifier 180 having a feedback path to a second input through a resistor 186 and resistor 187 to ground. An output of the amplifier 180 connects to an amplifier within the block 178 through a resistor 188. An output of the sample peak detector 40 is applied to an input of a second amplifier within the block 178 through a resistor 190 and this signal is also applied to one input of the operational amplifier 182 having a second input connected to a feedback circuit including resistors 192 and 194. An output of the amplifier 182 connects to an input of the second amplifier group of the block 178 through a resistor 196.

By the interconnection of the amplifiers 180 and 182 and the amplifiers within the block 178, two outputs are generated. One output varies as the logarithm of the amplitude of the sample path pulses and the second varies as the logarithm of the amplitude of the reference path pulses. These signals are coupled to separate inputs of an operational amplifier 198 through resistors 200 and 202. Also connected to the resistor 202 is a resistor 204 connected to ground. A feedback path including a resistor 206 and a resistor 208 is tied to the resistor 200. The resistor 208 connects to the wiper arm of a variable resistor 210 having end terminals supplied from a minus and negative reference supply, to be described.

The amplifier 198 and associated circuitry comprises the differential amplifier 60 having an output connected to the scaling circuit 62 that consists of a two-pole, four-position switch 212. Each of the upper four paths of the switch 212 include a variable resistor 214–217 and each of the lower paths include a fixed resistor 218–222.

The upper arm of the switch 212 connects to one input of an operational amplifier 224 having a second input connected to the lower wiper arm of the switch. A feedback path including a capacitor 226 and a resistor 228 connects between the output of the amplifier 224 and one input thereof. Also connected to the output of the amplifier 224 is a variable resistor 230 in series with the meter movement 68. A zero adjusting circuit for the meter movement 68 includes a variable resistor 232 connected between a minus reference voltage and ground.

As discussed previously, when an explosive concentration of hydrocarbon gas exists in the sample chamber 10, the alarm circuit 70 is triggered to turn on the audible alarm 72. The alarm circuit 70 includes a variable resistor 234 connected to the output of the operational amplifier 162 and to a minus reference supply at terminal 236. The wiper arm of the variable resistor 234 ties to one input of a comparator 238 having a second input grounded through a line 240. An output of the comparator 238 drives a switching circuit including a transistor 242 having a base resistor 244 connected to the amplifier 238. A resistor 246 interconnects between the emitter electrode of the transistor 242 and the base electrode thereof. Connected to the collector electrode of the transistor 242 is the alarm 72 which may comprise a horn, bell or other audible or visual indicator.

To provide the reference voltages to the various subcircuits throughout the circuit of FIG. 4, a DC voltage as supplied by a battery provides a negative voltage to a terminal 248 and a positive voltage to a terminal 250. The circuit for supplying the negative reference voltage connects to the terminal 248 and includes a Zener diode 252, a resistor 254, a capacitor 256 and a Zener diode 258. The negative reference voltage is generated at the junction of the resistor 254, the capacitor 256 and the anode electrode of the Zener diode 258. The circuit for generating the positive reference voltage includes a resistor 260 connected to the terminal 250, a capacitor 262 and a Zener diode 264 connected to the second terminal of the resistor 260. The positive reference voltage appears at the interconnection of the resistor 260 and the capacitor 262 and Zener diode 264.

Figure 5:
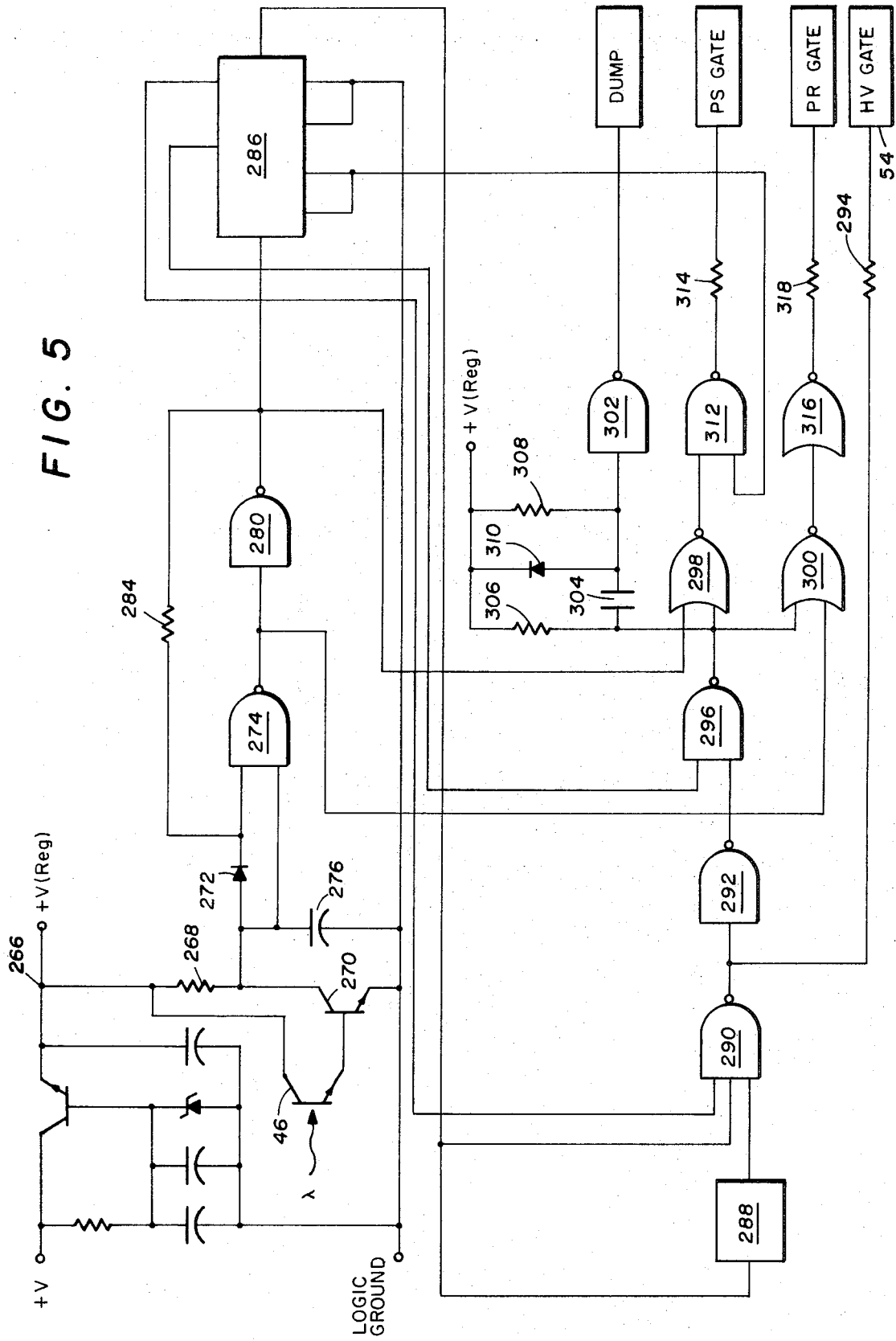
FIG. 5 is a logic diagram for establishing timing signal to sequence the operation of the circuit of FIG. 4.

Referring to FIG. 5, timing signals for gating the laser 16 and the peak detectors 40 and 42 are generated in response to a signal from the photodetector 46 which typically may be a light responsive transistor having a collector electrode connected to a resistor 268 and the output of a regulated supply at terminal 266. An emitter electrode of the diode 46 ties to the base of a transistor 270 having a grounded emitter and a collector electrode connected to the resistor 268.

A signal at the collector of the transistor 270 is applied through a diode 272 to one input of a NAND gate 274. A second input to the NAND gate 274 is coupled directly to the collector electrode of the transistor 270. Also connected to the second input of the NAND gate 274 is a capacitor 276. Connected to the output of the gate 274 is a NAND gate 280 having an output connected to a resistor 284 for controlling the sequential operation of the gates 274 and 280.

Timing signals generated at the output of the gate 280 are applied to one input of a binary counter 286 interconnected to provide various timing signals to the remainder of the logic circuit 44. One series of timing pulses from the binary counter 286 is applied to the input of a single counter 288 and a NAND gate 290. An output of the single shot gate 288 also connects to an input of the NAND gate 290 and a second series of pulses from the register 286 connects to the NAND gate 290. Logic level pulses from the gate 290 are applied to a NAND gate 292 and in addition represent the triggering pulses for gating on the laser 16 as applied to the terminal 54 through a resistor 294.

The NAND gate 292 serves to invert the output of a NAND gate 290 and this signal is applied to one input of a NAND gate 296 having a second input from the counter 286. Signals generated at the output of the NAND gate 296 are coupled to one input of a NOR gate 298, one input of a NOR gate 300 and an input of a NAND gate 302 through a capacitor 304. Also coupled to the input of the NAND gate 302 is a circuit including resistors 306 and 308 and a diode 310. An output from the NAND gate 302 is a series of logic timing pulses coupled to the base electrodes of the transistors 132 and 154 for clearing the peak detector capacitors 140 and 158.

A second input to the NOR gate 298 is the output of the NAND gate 280. The NOR gate 298 provides one input to a NAND gate 312 having a second input from the counter 286. An output of the NAND gate 312 is a series of timing pulses applied to the base electrode of transistor 174 through resistor 314. The NOR gate 300 has a second input from the output of the NAND gate 274 and provides a series of pulses to a NOR gate 316 that inverts the output of the gate 300. An output of the NOR gate 316 is a series of timing pulses for controlling the transistor 176 through a resistor 318.

Thus, the logic circuit 44 as detailed in FIG. 5 provides four series of timing pulses controlling the operation of the system of FIG. 2, specifically gating the peak detectors 40 and 42 and triggering the laser 54 at the proper times.

While only one embodiment of the invention, together with modifications thereof, has been described in detail herein and shown in the accompanying drawings, it will be evident that various further modifications are possible without departing from the scope of the invention.

What is claimed is:

1. A hydrocarbon gas detector having a monochromatic light source emitting radiation in the region absorbent of hydrocarbon molecules, said beam split into a sample path beam and a reference path beam both directed through a sample chamber along separate paths to a detector means having an output related to the energy in the sample path and reference path, the improvement comprising:
   a sample channel circuit responsive to the output signal of the detector means related to the sample path, energy for generating a sample channel output,
   a reference channel circuit responsive to the output signal of the detector means related to the reference path energy for generating a reference channel output,
   a logarithmic amplifier connected to the output of the sample channel circuit and the reference channel circuit and generating two outputs, one varying as the logarithm of the sample channel output and the second varying as the logarithm of the reference channel output,
   a differential amplifier connected to the outputs of said logarithmic amplifier and having an output varying as the ratio of the sample channel output over the reference channel output, and
   output circuit means responsive to the output of said differential amplifier to generator a measure of the concentration of hydrocarbon gas in the sample chamber.

2. A hydrocarbon gas detector as set forth in claim 1 including an alarm responsive to a predetermined level of output signal from said reference channel circuit to indicate a concentration of hydrocarbon gas in the test chamber above an established level.

3. A hydrocarbon gas detector as set forth in claim 1 including a gain control adjustment connected to said sample channel circuit to adjust the output thereof to be substantially equal to the output of the reference channel circuit with a hydrocarbon free gas sample in the test chamber.

4. A hydrocarbon gas detector as set forth in claim 1 including circuit means for timing the response of the sample channel circuit and the reference channel circuit to the detector output only when the respective path energy is applied to said detector.

5. A hydrocarbon gas detector as set forth in claim 4 wherein said timing means connects said sample channel circuit and said reference channel circuit to the detector output at preselected time intervals.

6. A hydrocarbon gas detector as set forth in claim 5 wherein said sample channel circuit and said reference channel circuit each include a gated peak detector responsive to the output of the detector means during the preselected time intervals and storing the detector output until a subsequent gating time interval.

7. A hydrocarbon gas detector having a monochromatic light source emitting radiation in a region absorbent of hydrocarbon molecules, comprising in combination:
   means for splitting the radiation into a sample path beam and a reference path beam both through a sample chamber containing a gas sample along separate paths,
   radiant energy detector means responsive to energy in the sample path and the reference path and generating an output signal related to each,
   a sample channel circuit responsive to the output signal of said detector means related to the sample path energy for generating a sample channel output,
   a reference channel circuit responsive to the output signal of said detector means related to the reference path energy for generating a reference channel output,
   means for establishing a timing interval for connecting said sample channel circuit to said detector means to respond only to the sample path energy and for sequentially connecting the reference channel circuit to said detector means to respond only to the reference path energy, and
   output circuit means responsive to an output from said sample channel circuit and said reference channel circuit to generate a measure of the hydrocarbon gas in the sample chamber.

8. A hydrocarbon gas detector as set forth in claim 7 wherein said output circuit means includes a differential amplifier responsive to the output of the sample channel circuit and the reference channel circuit and providing an output related thereto.

9. A hydrocarbon gas detector as set forth in claim 7 wherein said output circuit means includes a logarithmic amplifier connected to the output of the sample channel circuit and the reference channel circuit and generating two outputs, one varying as the logarithm of the sample channel output and the second varying as the logarithm of the reference channel output, and
a differential amplifier connected to the outputs of said logarithmic amplifier and having an output varying as the ratio of the sample channel output over the reference channel output.

10. A hydrocarbon gas detector as set forth in claim 9 wherein said output circuit means further includes an indicating meter responsive to the output of said differential amplifier.

11. A hydrocarbon gas detector as set forth in claim 7 including an alarm responsive to a predetermined level of output signal from said reference channel circuit to indicate a concentration of hydrocarbon gas in the sample chamber above an established level.

12. A hydrocarbon gas detector as set forth in claim 7 including a gain control adjustment connected to said sample channel circuit to adjust the output thereof to be substantially equal to the output of the reference channel circuit with a hydrocarbon free gas sample in the sample chamber.

13. A hydrocarbon gas detector as set forth in claim 7 wherein said means for establishing a timing interval connects said sample channel circuit and said reference channel circuit to said radiant energy detector means at preselected time intervals.

14. A hydrocarbon gas detector as set forth in claim 13 wherein said sample channel circuit and said reference channel circuit each include a gated peak voltage detector responsive to the output of said energy detector means during the selected predetermined time intervals and storing the detector output until a subsequent gating time interval.

15. A hydrocarbon gas detector, comprising in combination:
a monochromatic light source emitting radiation in the region absorbent of hydrocarbon molecules,
means for splitting the radiation into a sample path beam and a reference path beam,
a sample chamber containing a gas sample,
a radiant energy detector,
means for directing the sample beam through said sample chamber in a first direction to said detector means,
means for directing the reference beam through said test chamber in a second separate direction to said detector means,
a sample channel circuit responsive to the output signal of said detector related to the sample path energy for generating a sample channel output,
a reference channel circuit responsive to the output signal of said detector related to the reference path energy for generating a reference channel output,
means for establishing a timing interval for connecting said sample channel circuit to said detector to respond only to the sample channel energy and for connecting the reference path circuit to said detector to respond only to the reference path energy, and
output circuit means responsive to an output from said sample channel circuit and said reference channel circuit to generate a measure of hydrocarbon gas in the sample chamber.

16. A hydrocarbon gas detector as set forth in claim 15 wherein said means for establishing a timing interval includes means for gating the monochromatic light source on for a preselected time interval.

17. A hydrocarbon gas detector as set forth in claim 16 wherein said means for splitting the radiation beam into a sample path and a reference path includes triggering means for actuating the means for establishing a timing interval.

18. A hydrocarbon gas detector as set forth in claim 17 wherein said means for establishing a timing interval includes synchronizing means for connecting said sample channel circuit and said reference channel circuit to the detector output at preselected time intervals during an "on" cycle of said monochromatic light source.

19. A hydrocarbon as detector as set forth in claim 15 wherein said output circuit means includes a logarithmic amplifier connected to the output of the sample channel circuit and the reference channel circuit and generating two outputs, one varying as the logarithm of the sample channel output and the second varying as the logarithm of the reference channel output, and
a differential amplifier connected to the outputs of said logarithmic amplifier and having an output varying as the ratio of the sample channel output over the reference channel output.

20. A hydrocarbon gas detector as set forth in claim 19 including an alarm responsive to a predetermined level of output signal from said reference channel circuit to indicate a concentration of hydrocarbon gas in the sample chamber above an established level.

21. A hydrocarbon gas detector as set forth in claim 20 including a gain control adjustment connected to said sample channel circuit to adjust the output thereof to be substantially equal to the output of the reference channel circuit with a hydrocarbon free sample in the sample chamber.

* * * * *